United States Patent [19]

Calvani et al.

[11] Patent Number: 5,661,554
[45] Date of Patent: Aug. 26, 1997

[54] METHOD OF AND DEVICE FOR MEASURING THE NONLINEAR REFRACTIVE INDEX IN A SINGLE MODE OPTICAL FIBRE

[75] Inventors: Riccardo Calvani, Pino Torinese; Renato Caponi, Turin; Claudio Naddeo, Pino Torinese; Diego Roccato, Turin, all of Italy

[73] Assignee: Cselt—Centro Studi e Laboratori Telecomunicazioni S.p.A., Turin, Italy

[21] Appl. No.: 635,012

[22] Filed: Apr. 19, 1996

[30] Foreign Application Priority Data

Jun. 2, 1995 [IT] Italy ................ TO95A0455

[51] Int. Cl.$^6$ ................ G01N 21/41
[52] U.S. Cl. ................ 356/73.1
[58] Field of Search ................ 356/73.1

[56] References Cited

PUBLICATIONS

Namihira et al "Nonlinear Coefficient Measurements for Dispersion Shifted Fibres Using Self–Phase Modulation Method at 1.55 μm", Electronics Letters, vol. 30, No. 14 7 Jul. 1994, pp. 1171–1172.

Polarization Multiplexing with Solitons, Journal of Lightwave Technology, vol. 10, No. 1, Jan. 1992 pp. 28–35.

The Supercontinuum Laser Sosurce, Robert R. Alfano, Editor, Springer–Verlag, 1989 pp. 34–40.

Measurement of the Nonlinear Index of Silica–Core, Feb. 15, 1994, Optics Letters pp. 257–259.

Fiber Nonlinearity, Robert Tkach, AT&T Laboratories, OFC '95 Technical Digest pp. 312–313.

Nonlinear Coefficient Measurements for Dispersion Shifted Fibers, Namihira et al, Electronics Letters, 7 Jul. 1994, vol. 30 #14, pp. 1171–1172.

*Primary Examiner*—Vincent P. McGraw
*Attorney, Agent, or Firm*—Herbert Dubno

[57] ABSTRACT

A train of transform-limited optical pulses with wavelength close to the zero-dispersion wavelength of the fiber and high and variable peak power, such as to give rise to self-phase modulation, is sent into a fiber. The spectral broadening of the signal exiting the fiber is measured for a number of values of the peak power of the pulses and the nonlinear refractive index is obtained from the angular coefficient of the straight line representing spectral broadening versus peak power.

3 Claims, 3 Drawing Sheets

METHOD OF AND DEVICE FOR MEASURING THE NONLINEAR REFRACTIVE INDEX IN A SINGLE MODE OPTICAL FIBRE

SPECIFICATION

1. Field of the Invention

Our present invention relates to the characterization of optical fibers and, more particularly, to a method and a device for measuring the Kerr non-linearity coefficient (or nonlinear refractive index coefficient) in a single mode optical fiber.

2. Background of the Invention

In most materials of interest for optical communications, one of the main nonlinear phenomena is the Kerr optical effect, which acts on the refractive index making it depend on optical intensity I according to the formula:

$$n(I) = n_0 + n_2 I \tag{1}$$

where n(I) is the refractive index as a function of the intensity (and therefore of the power) of the radiation sent into the fiber, $n_0$ is the linear refractive index, while $n_2$ is the so-called nonlinear coefficient of the refractive index (also called simply nonlinear refractive index).

Due to the introduction of optical amplifiers in optical communication systems, the powers transmitted along a fiber make nonlinear effects linked to $n_2$ no longer negligible. These effects can cause significant degradation in the performance of a system or, conversely, they can be exploited with new technical advantages. It is, therefore, important to know these effects with precision. In the case of optical fiber, the nonlinear refractive index $n_2$ in general is obtained indirectly, through a measurement of the so-called Kerr non-linearity coefficient γ, which is proportional to $n_2$ and also takes into account the confinement of light in the fiber, thus providing more complete information, from the operational point of view, than does $n_2$, which is a parameter depending only on the material. Coefficient γ is given by relation:

$$\gamma = (2\pi/\lambda_p) \cdot (n_2/A_{eff}) = (\omega_p/c) \cdot (n_2/A_{eff}) \tag{2}$$

where $\lambda_p$ and $\omega_p$ are respectively the wavelength and the angular frequency of the radiation sent into the fiber, c is the velocity of light and $A_{eff}$ is the effective area of the core of the fiber, which is a parameter providing a measure of the optical confinement of light inside the fiber. From the value of γ it is, therefore, possible to obtain the value of $n_2$, once $A_{eff}$, which needs to be obtained with an independent measurement, is known.

Several methods of determining γ or $n_2$ are known. The most commonly used ones entail sending high power optical pulses into the fiber and analyzing the spectrum of the pulses exiting the fiber in order to measure the nonlinear phase shift $\Phi_{NL}$ induced by each pulse on itself (self-phase modulation). This phase shift is due to the fact that the pulse changes the refractive index of the fiber, as indicated by relationship (1), and it is linked to coefficient γ by relation $\Phi_{NL} = \gamma \cdot P \cdot L$, where P is the pulse power and L the length of the fiber. The pulses used are in general very short, to obtain the high peak powers required, since $n_2$ in silica is very small (order of magnitude: 10–20 m²/W).

Examples of such methods are described in the papers: "Measurement of nonlinear index of silica-core and dispersion-shifted fibers", by K. S. Kim et al., Optics Letters, Vol. 19, no. 4, 15 Feb. 1994, pp. 257 et seq., "Nonlinear coefficient measurement for dispersion shifted fibers using self-phase modulation method at 1.55 μm", by Y. Namihira et al., Electronics Letters, Vol. 30, No. 14, 7 Jul. 1994, pp. 1171–1172, and in the paper "Nonlinear-index measurement by SPM at 1.55 μm", by R. H. Stolen et al., presented at OFC'95, San Diego (USA), 26 Feb.–2 Mar. 1995, paper FD1. In particular, according to these methods, use is made of the fact that the spectrum of the pulse at the output of the fiber presents a succession of maxima and minima, whose number depends on the instantaneous power of the pulse and whose positions correspond to values of $\Phi_{NL}$ that are odd multiples of π/2. By measuring power P at these points, one obtains $\Phi_{NL}$ and therefore γ.

A measurement of this kind has limited accuracy, since it is difficult to exactly determine the points of maximum and minimum, and therefore, given the small size of the peaks, the power value measured can be affected by even quite large errors.

OBJECT OF THE INVENTION

It is an object of the invention to provide a method and a device which do not require the evaluation of power maxima and minima and hence allow an accurate measurement of $n_2$ or γ.

SUMMARY OF THE INVENTION

The invention is based on a measurement of the spectral broadening undergone by a high power pulse because of the Kerr effect. It has been demonstrated (see Q. Z. Wang et al.: "Supercontinuum Generation in Condensed Matter", in "The Supercontinuum Laser", edited by R. R. Alfano, Springer-Verlag 1989, Ch. 2, par. 2, pp. 34–40) that, when operating under conditions in which the group velocity dispersion in the fiber, the absorption and the Raman effect can be ignored, the pulse has such characteristics as to give rise only to self-phase modulation. In this case the electric field in each time position τ along the pulse has an instantaneous frequency $$\omega(\tau) = \omega_P + \delta\omega(\tau) \tag{3}$$

with $$\delta\omega(\tau) = -(\gamma/2)[\partial F^2(\tau)/\partial \tau] \cdot z \cdot P \tag{4}$$

where F(τ) is the envelope of the pulse launched into the fiber, z is the distance from the fiber launching end and P is the peak power of the pulse. At the output from the fiber, the spectrum of the pulse will have undergone an overall broadening given by the maximum of function (4) which, as can easily be deduced by taking the derivative of function (4) and setting the derivative to 0, is given by $$\Delta\omega_M = (\gamma/2)[\partial_1 - \partial_2] \cdot z \cdot P \tag{5}$$

where $\partial_1$, $\partial_2$ indicate the values of $\partial F^2(\tau)/\partial \tau$ at the two inflection points of intensity $F^2(\tau)$. The broadening therefore is a linear function of pulse power through a constant which depends on the characteristics of the pulse, on parameter γ and on the length of the fiber. From the measurement of the spectral broadening, it is easy to obtain γ and $n_2$. Note that the relations given above are valid for power values at least as high as to give rise to a doubling of the peak in the spectrum of the pulse.

Therefore, according to the invention a method is provided in which a signal comprising a train of transform-limited optical pulses is sent into the fiber, the pulses having a wavelength close to the zero-dispersion wavelength of the fiber and a high and variable power, so as to give rise to self-phase modulation, and the spectrum of the pulses exiting the fiber is analyzed. The method is characterised in that the spectral broadening of the signal exiting the fiber is measured for a number of values of the peak power of the pulses, such spectral broadening being a linear function of peak power according to a factor which depends on the nonlinear refractive index; the angular coefficient of the line representing said function is determined and the nonlinear refractive index is obtained from this angular coefficient.

Note that the pulses must have a short duration (e.g. 5–8 ps) but they must not be too short, as in that case they would occupy a very wide spectrum which could involve spectral regions of the fiber with high group velocity dispersion, thus voiding one of the conditions for the validity of relations (3)–(5).

As stated above, the self-phase modulation gives rise to a number of peaks in the spectrum of the pulse at the output of the fiber and the number of those peaks depends on the instant power of the pulse. The measurement of the spectral broadening can be carried out by either measuring the full width at half maximum (FWHM) of the spectrum or the distance between extreme peaks. According to the invention, the first quantity is preferably measured, since such a measurement has been proved to result in a better agreement between experimental data and the theoretical behavior of the spectral broadening versus the peak power, expressed by relation (5).

The invention concerns also the device carrying out the method, which comprises: means for generating and sending into the fiber a sequence of transform-limited optical pulses, with a high power such as to give rise to self-phase modulation and with wavelength close to the zero-dispersion wavelength of the fiber; means for varying the power of the pulses sent into the fiber and to measuring such power; means to analyzing the optical spectrum of the pulses exiting the fiber; and a processing system which obtains the nonlinear refractive index from the optical spectrum. According to the invention, the means for analyzing the optical spectrum of the pulses exiting the fiber are arranged to determine the spectral broadening of the pulses as the peak power varies and the processing system is arranged to obtain the nonlinear refractive index from the angular coefficient of the straight line representing the spectral broadening versus the peak power.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
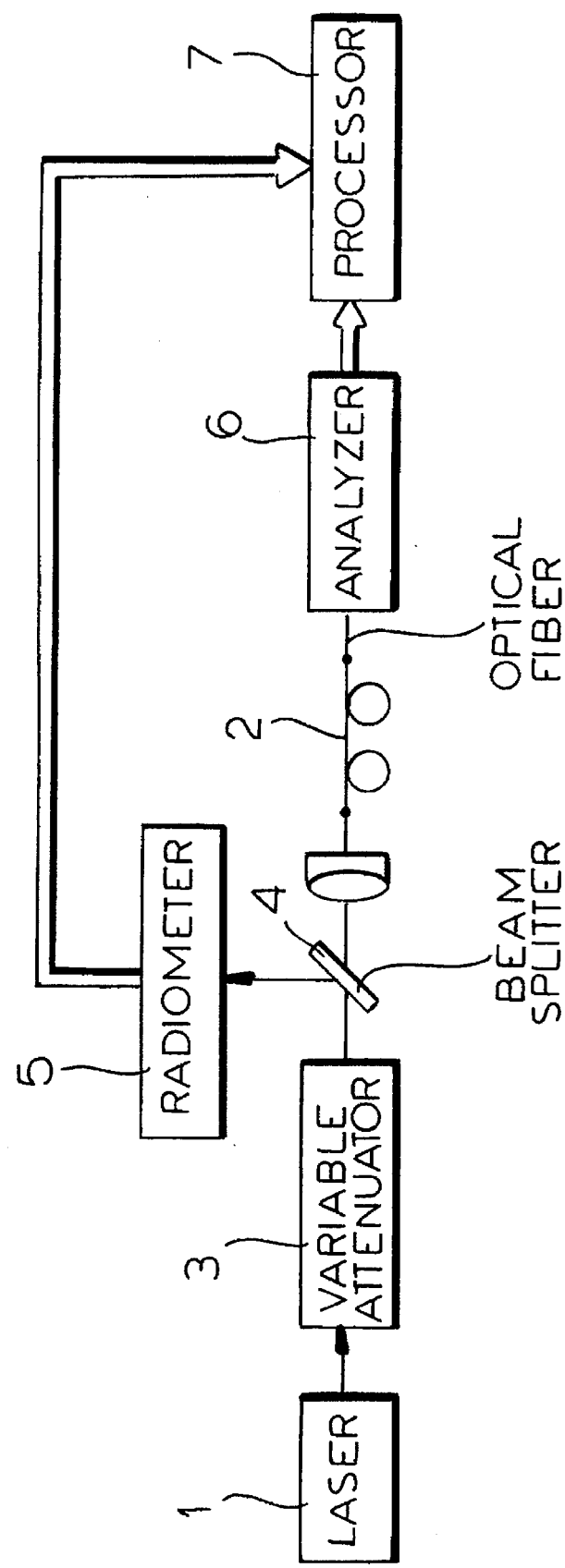
FIG. 1 is a schematic representation of the device which carries out the method.
Figure 2A:
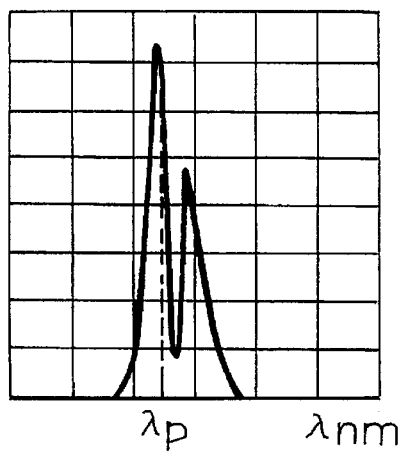
FIGS. 2A–2D are graphs of the spectrum at the output of the fiber, of a hyperbolic secant pulse for different values of the peak power.
Figure 2B:
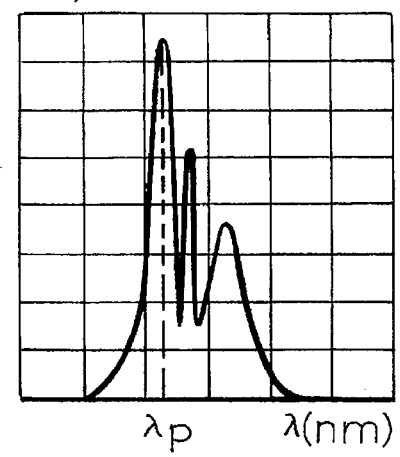
Figure 2C:
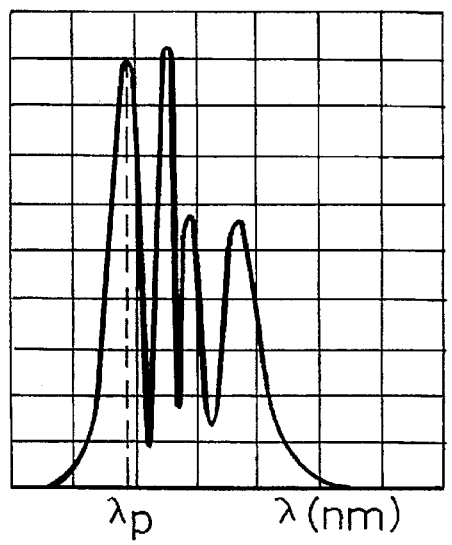
Figure 2D:
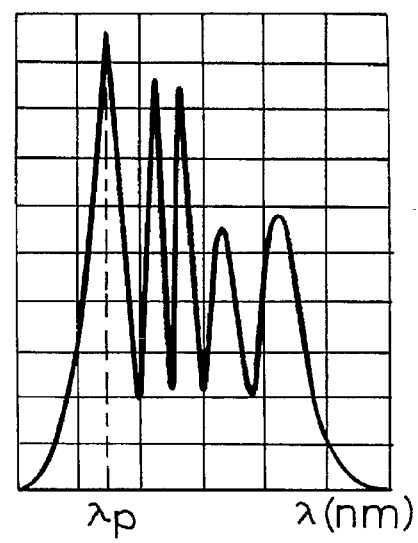

In the drawing thin lines indicate the path of the optical signals and double lines indicate electrical connections.

A source 1, e.y. a wavelength tunable color center laser, generates a train of pulses with duration $\Delta t$ and repetition period T, wavelength $\lambda_p$ close to the zero dispersion wavelength. $\lambda_0$ of a fiber 2 whose Kerr non-linearity coefficient is to be measured and such peak power as to give rise to self-phase modulation. The pulses are transform-limited or quasi-transform-limited pulses, that is pulses for which the product between the full width at half maximum $\Delta t$ and the bandwidth $\Delta v$ must have a certain value, corresponding to the theoretical minimum, which depends on the pulse shape.

Pulses with those characteristics are for instance hyperbolic secant pulses ($\Delta t \cdot \Delta v = 0.314$), Gaussian pulses ($\Delta t \cdot \Delta v = 0.441$) or Lorentzian pulses ($\Delta t \cdot \Delta v = 0.11$). The pulse train is launched into the fiber by means of a variable attenuator 3 that allows different values to be selected for average power. A beam splitter 4 placed between the attenuator and the fiber allows a fraction of the power associated with each pulse to be taken and sent to a radiometer 5 or to another power measuring device. The signal exiting fiber 2 is collected by an optical spectrum analyzer 6 or other instrument that is arranged to measure the spectral broadening of the pulses as peak power P varies. Advantageously, for the reasons given above, device 6 measures the maximum broadening $\Delta \lambda_M$ (to which a value $\Delta \omega_M$ corresponds) as the full width at half maximum of the output spectrum, which width, in a theoretical spectrum, substantially corresponds with the distance between the two extreme inflection points. A processing system 7, connected to analyzer 6 and radiometer 5, obtains the values of P (given by the product of the average power by the inverse $T/\Delta t$ of the duty cycle) from the individual values of the average power, stores the values of $\Delta \omega_M$ in correspondence with the different values of P, determines the angular coefficient of the straight line representing $\Delta \omega_M$ versus P and obtains the value of $\gamma$ and therefore of $n_2$, from such angular coefficient. Such a value, taking into account relations (5) and (2) is given by $$n_2 = \frac{2 \cdot \Delta \omega_M \cdot A_{\mathit{eff}} \cdot c}{\omega_p \cdot (\partial_1 - \partial_2) \cdot z} \qquad (6)$$

where $\partial_1$ and $\partial_2$ are computed analytically for each type of pulse ($\partial_1 = -\partial_2$ for symmetrical pulses like the ones mentioned above).

The values of peak power P must be high enough to give rise to self-phase modulation but not so high as to cause a Raman effect in the fiber. The minimum value can be on the order of 1 W, a value for which a doubling of the peak in the spectrum of the pulse starts to occur. Taking into account that the peak power threshold for which the Raman effect occurs is of the order of one hundred Watts, a maximum value for P can be a few tens of Watts, for instance about 20 W.

In an exemplary embodiment of the invention, the fiber was a dispersion-shifted fiber with a length of 0.5 km and a zero-dispersion wavelength $\lambda_0 = 1558$ nm, the source had a wavelength $\lambda = 1549.5$ nm (and therefore an angular frequency $\omega_p = 12.15 \cdot 10^{14} \mathrm{s}^{-1}$) and an effective area $A_{\mathit{eff}} = 43 \cdot 10^{-12} \mathrm{m}^2$; the pulses were hyperbolic secant pulses with bandwidth $\Delta v = 55$ GHz and full width at half maximum $\Delta t = 5.7$ ps (and therefore product $\Delta t \cdot \Delta v = 0.314$), and repetition frequency 76 MHz. For these pulses, it is easy to see that equations (4) and (6) become respectively $$\Delta \omega_M = \frac{8 \, c h^{-1}(\sqrt{2})}{3 \sqrt{3}} \cdot \frac{\gamma \cdot z}{\Delta t} \cdot P \qquad (7)$$

$$n_2 = \frac{3\sqrt{3}}{8 \, ch^{-1}(\sqrt{2})} \cdot \frac{\Delta t \cdot A_{\text{eff}} \cdot c}{\omega_p \cdot z} \quad (8)$$

All parameters appearing in relation (8) are constant quantities for a given system configuration. Processing system 7 can therefore immediately obtain value $n_2$.

Figure 3:
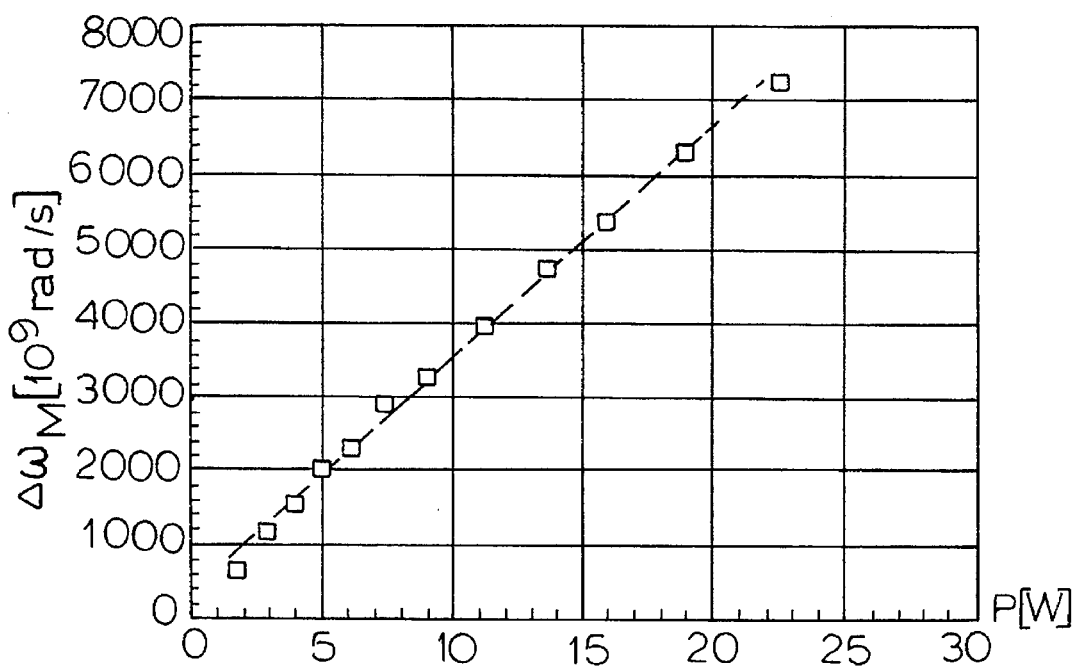
FIG. 3 is a graph of the spectral broadening versus the peak power for the values of power considered in FIG. 2.
Figure 4:
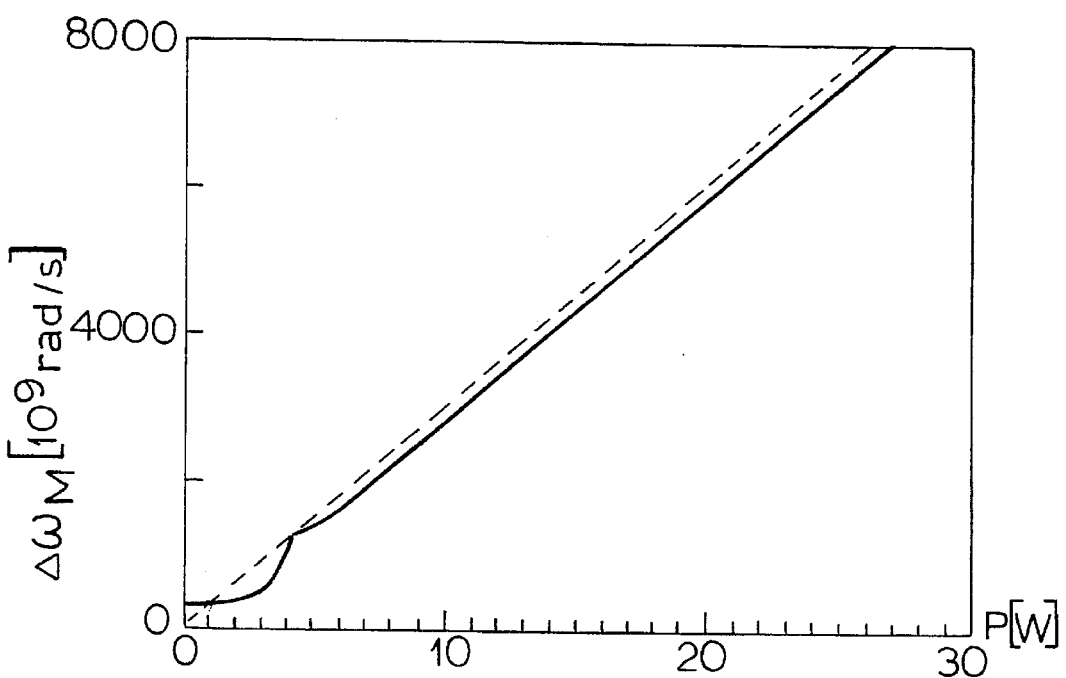
FIG. 4 is a graph showing the theoretical and experimental curves of the spectral broadening versus the peak power.

FIGS. 2A–2D represent the output spectra corresponding to four values of peak power (respectively 3.85 W, 5.98 W, 11.19 W and 15.4 W). In those Figures each interval corresponds to 2 nm (x-axis) and 25 μW (y-axis). The Figures clearly show the peaks due to self-phase modulation. FIG. 3 shows spectral broadening $\Delta\omega_M$ (obtained from the full width at half maximum $\Delta\lambda_M$) versus the peak power for a number of values of peak power, including the values corresponding to FIGS. 2A–2D. The linear behavior of $\Delta\omega_M$ is clearly apparent. In order to take into account the fact that the two extreme peaks of the output spectrum have different heights so that the two half-maximum points have different ordinates $h_s$, $h_d$ (contrary to what happens in the theoretical spectrum), the distance between the extreme points with ordinate $(h_s + h_d)/2$ has been considered as the full width at half maximum. The experimental values, fitted into a straight line, yielded a value of $2.6 \cdot 10^{-20}$ m²/W for $n_2$. Such a value is in good agreement with both the theoretical values given by relation (5) (see FIG. 4, where the solid line corresponds with the experimental data and the dotted line with the theoretical behavior) and the values measured with other methods.

Note also that, in the measurement conditions described herein (fiber 0.5 Km long), polarization remains substantially constant for the whole time taken by the measurement and hence it does not affect the results obtained. Should the effect of the random statistical evolution of polarisation be no longer negligible (as it might happen when using fiber spans of a few tens of kilometers), correcting factor 8/9 should be applied to the value determined by the measurement, as is well known to the art (see S. Γ. Evangelides et al. "Polarization Multiplexing with Solitons", Journal of Lightwave Technology, Vol. 10, No. 1, January 1992, pages 28 and fol.).

It is evident that what has been described is given solely by way of non-limiting example and that variations and modifications are possible without departing from the scope of the invention.

We claim:

1. A method of measuring a nonlinear refractive index of a single-mode optical fiber which comprises the steps of
    (a) launching a train of transform limited or quasi transform limited optical pulses into an optical fiber, said pulses having a wavelength close to a zero-dispersion wavelength of the fiber and a high and variable power giving rise to self-phase modulation;
    (b) analyzing a spectrum of pulses exiting the fiber; measuring spectral broadening of a signal representing pulses exiting the fiber is measured for a number of values of peak power of the pulses, said spectral broadening being a linear function of the peak power according to a factor depending on the nonlinear refractive index;
    (d) determining an angular coefficient of a straight line representing said function; and
    (e) obtaining the nonlinear refractive index from said angular coefficient.

2. The method defined in claim 1, wherein the spectral broadening is measured as the full width at half maximum of the output spectrum.

3. A device for measuring a nonlinear refractive index in a single mode fiber, comprising:
    means for generating and sending into an optical single mode fiber a train of transform-limited optical pulses, with such a power as to induce self-phase modulation in the fiber and with a wavelength close to a zero-dispersion wavelength of the fiber;
    means, connected to said means for generating, for varying the power of the pulses sent into the fiber and for measuring said power;
    means connected to said fiber for analyzing an optical spectrum of pulses exiting the fiber and arranged to determine the spectral broadening of the pulses as the peak power varies; and
    a processing system for obtaining the nonlinear refractive index from the optical spectrum and from an angular coefficient of the straight line representing spectral broadening versus peak power.

* * * * *